(No Model.)
S. C. SCHOFIELD.
RUNNER ATTACHMENT FOR WHEELED VEHICLES.
No. 520,806. Patented June 5, 1894.
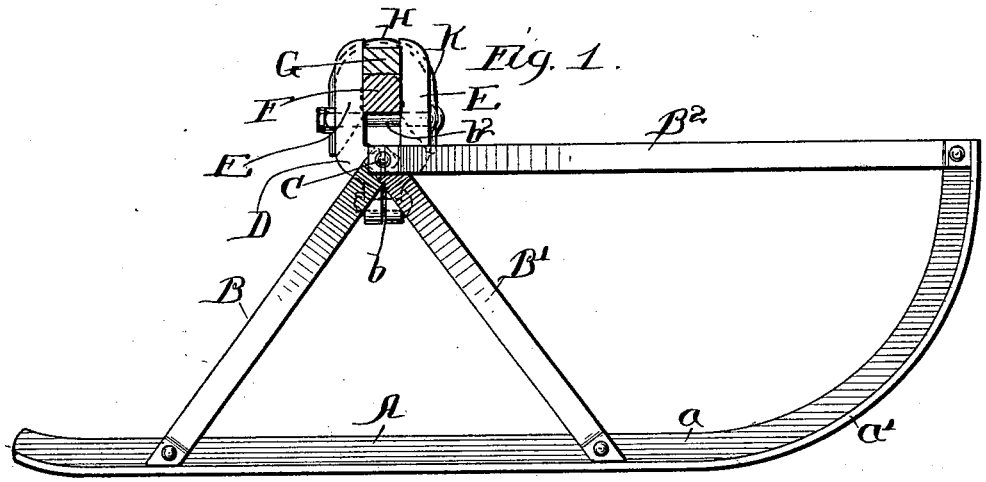
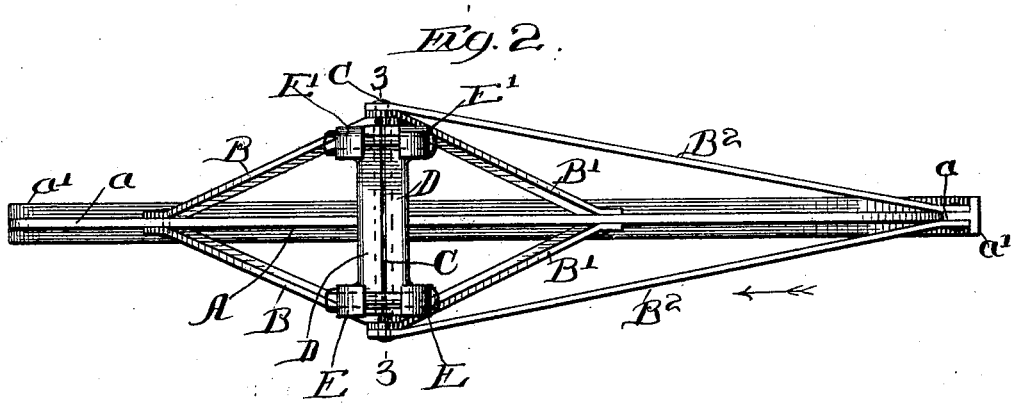
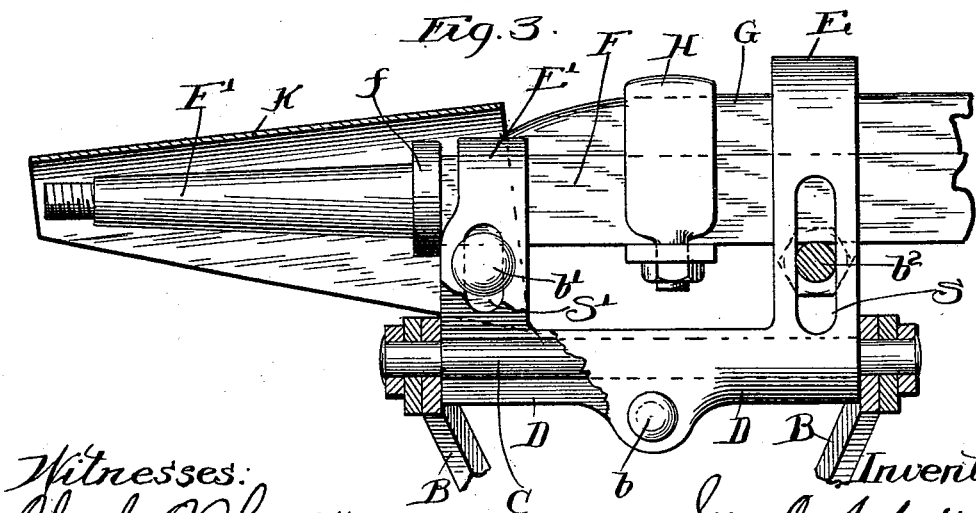

UNITED STATES PATENT OFFICE.

SILAS C. SCHOFIELD, OF FREEPORT, ILLINOIS.

RUNNER ATTACHMENT FOR WHEELED VEHICLES.

SPECIFICATION forming part of Letters Patent No. 520,806, dated June 5, 1894.

Application filed February 7, 1894. Serial No. 499,318. (No model.)

*To all whom it may concern:*

Be it known that I, SILAS C. SCHOFIELD, a citizen of the United States of America, residing at Freeport, in the county of Stephenson and State of Illinois, have invented certain new and useful Improvements in Runner Attachments, of which the following is a specification.

My invention relates to improvements in what are known in the trade as runner attachments, that is to say, sled runners adapted to be readily attached to the axles of wheel vehicles, and to take the place of the wheels as moving supports for the vehicles.

The invention is fully described and explained in this specification and shown in the accompanying drawings, in which—

Figure 1 is a side elevation of a runner attachment embodying my improvements. Fig. 2 is a top plan thereof and Fig. 3 is a view partly in front elevation and partly in vertical section showing details of the means for attaching the device to an axle, the plane of section being through the line 3—3, Fig. 2, and the view being in the direction indicated by the arrow in said figure.

In the views, A is a suitably curved T-beam of steel or iron, made up of a web, $a$, and a flange, $a'$, which forms the tread of the runner. The beam, A, supports and is braced by a series of braces, B, B', B², arranged in pairs as shown in the drawings, the three braces on either side being connected at a common center, and the centers being spread apart and held in place by a transverse rod, C, whose ends pass through the ends of the braces and are secured by riveting or otherwise as shown in Fig. 3. On the rod, C, is secured a clamp made up of two plates, D, D, clamping the rod and held together by a bolt, $b$, each of the plates being provided with two upwardly extending jaws, E, E', formed with slots, S, S', adapted to receive bolts, $b'$, $b^2$. The corresponding jaws, E, E', of the two plates, D, D, are directly opposite each other and are adapted to clamp between them the axle, F, and axle bed, G, of a vehicle of ordinary construction. The slotting of the jaws, E, E', permits adjustment of the bolts, $b'$, $b^2$, to adapt the attachment to different forms and sizes of axles and axle beds and the attachment is thus suited to any ordinary vehicle.

The attachment is ordinarily applied to the axle in the position shown in Fig. 3, the jaw, E', being just inside the collar, $f$, of the axle, and the clip, H, which holds the axle and axle bed together, being between the two pairs of jaws. The device may, however, be shifted toward the end of the axle, the jaw, E, being placed between the clip, H, and the collar, $f$, and the jaw, E', being applied to the spindle, F', of the axle.

I have found it very desirable in the use of this attachment to protect the axle spindle by means of a suitable cover and for this purpose have provided the attachment with a hood, K, formed of sheet metal and having near its inner end holes so placed as to receive the bolt, $b'$, which connects the jaws, E'. When this bolt is tightened so as to hold the jaws firmly together, it secures the hood in any desired position and forms a practical protection for the spindle.

The runner attachment thus formed is extremely strong, light, simple and cheap. It may be readily attached to the axles of any vehicle of usual construction and answers every purpose for which it is designed, and its elasticity and the arrangement of its braces are such as to make it extremely durable under the severest shocks to which it is exposed in practical use.

Having now described and explained my invention, what I claim as new, and desire to secure by Letters Patent, is—

1. In a runner attachment the combination with the T-beam, A, of the diagonal braces, B, B', and approximately horizontal braces, B², arranged in pairs as shown, the transverse bar, C, spreading and connecting the braces and means substantially as shown and described for detachably connecting said rod with the axle of a vehicle.

2. The combination with the curved beam, A, the braces, B, B', B², and the transverse rod, C, spreading and connecting the braces, of plates, D, D, clamped upon the rod, C, and provided with oppositely placed jaws, E, E', adapted to embrace an axle, and bolts, $b$, $b'$, passing through said jaws and adapted to clamp them upon the axle.

3. The combination with the beam, A, braces, B, B', B², and rod, C, of the plates, D, D, provided with longitudinally slotted jaws, E, E′, and the bolts, $b$, $b'$, adjustable in the slots in said jaws and adapted to clamp the jaws upon an axle.

4. The combination with the beam, A, and its braces and the transverse rod, C, connecting said braces, of the plates, D, D, clamped upon the rod, C, and formed with jaws, E, E′, adapted to embrace an axle, the bolts, $b'$, $b^2$, passing through said jaws and the hood, K, held in place by the bolt, $b'$, and adapted to cover the spindle of an axle clamped between the jaws; substantially as shown and described.

<div style="text-align:right">SILAS C. SCHOFIELD.</div>

Witnesses:
   J. A. CRAIN,
   S. A. BUCKMAN.